2,799,714
Patented July 16, 1957

2,799,714

METHOD OF HYDROLYZING DI- AND TRICHLOROBENZENES

Alexander H. Widiger, Jr., Midland, Mike L. Aaron, Hemlock, and Gordon F. Dugan, Beaverton, Mich., assignors to The Dow Chemical Company, Midland, Mich., a corporation of Delaware No Drawing. Application January 24, 1955,
Serial No. 483,799

8 Claims. (Cl. 260—623)

This invention concerns an improved process for hydrolyzing di- and trichlorobenzenes to produce mono- and dichlorophenols.

It is known that monochloro- and dichlorophenols may be prepared by heating a di- or trichlorobenzene with an alkali metal hydroxide, e. g. sodium hydroxide, dissolved in, or mixed with, methyl alcohol, at elevated temperatures and pressures. The use of a copper-containing catalyst for the reaction is also known.

U. S. Patent No. 2,126,648, describes the hydrolysis of ortho- and para-dichlorobenzenes with a mixture consisting of an alkali metal hydroxide, an alkaline earth metal hydroxide, methyl alcohol and water and a copper catalyst at temperatures between 150° and 190° C. under pressure sufficient to maintain essentially all of the alcohol in liquid phase. U. S. Patent No. 2,615,923, describes the hydrolysis of 1,2,4-trichlorobenzene by heating a mixture of the trichlorobenzene, sodium hydroxide and a 90 percent methanol-10 percent water solution under pressure at a temperature of 150° C. for a period of 6 hours. The product is stated to consist of a mixture of dichloroanisoles, unreacted trichlorobenzene and 2,5-dichlorophenol.

There are several objections to the methods heretofore proposed for the hydrolysis of di- and trichlorobenzenes particularly for carrying out of the hydrolysis of di- and trichlorobenzenes on a commercial scale to produce mono- and dichlorophenols. The principal disadvantage of the prior methods is that of employing methanol in the hydrolysis reaction. Considerable proportions of the methanol are consumed in the formation of ethers, e. g. dimethyl ether, or methyl ether of the chlorophenol product such as dichloroanisole, and the alcohol must be replaced by new supplies. The employment of methyl alcohol in the hydrolysis reaction takes up valuable reactor space and lowers the capacity for reactants for a given reaction vessel, increases the problems of separation and recovery in obtaining the final product, is expensive and adds to the cost of the final product. The employment of a copper-containing catalyst, e. g. finely divided copper or cuprous oxide, is disadvantageous in the carrying out of the hydrolysis in continuous manner because of the difficulty of maintaining the catalyst uniformly dispersed in the mixture and in intimate contact with the reactants.

It has now been found that polychlorinated benzenes containing from two to three chlorine atoms in the molecule such as ortho-, meta-, or para-dichlorobenzene, 1,2,4-trichlorobenzene, 1,2,3-trichlorobenzene, or 1,3,5-trichlorobenzene, can readily be hydrolyzed, whereby a single chlorine atom in the molecule is converted to a hydroxyl group, or the corresponding metal-oxy group, to produce mono-, or dichloro-substituted phenols, or salts thereof, by reacting the di- or trichlorobenzene with an alkali metal hydroxide dissolved in water at temperatures between 240° and 300° C. under pressure and in the absence of a copper-containing catalyst. The presence of a copper-containing catalyst in the reaction results in a lower yield of the chlorophenol product than is obtained in the absence of such catalyst. More specifically, it has been discovered that the hydrolysis of di- and trichlorobenzenes can readly be carried out to produce mono- and dichlorophenols in good yield by the carrying out of the hydrolysis under the following set of reaction conditions: (a) carrying out of the hydrolysis at reaction temperatures between 240° and 300° C.; (b) employing the alkali metal hydroxide in amount corresponding to from 1.8 to 4.5, preferably from 2 to 4 gram molecular proportions of the alkali metal hydroxide per gram molecular equivalent proportion of the di- or trichlorobenzene and in admixture with sufficient water to form an aqueous 2 to 10 weight percent solution of the alkali metal hydroxide; and (c) carrying out of the hydrolysis under a pressure at least as high as autogenous pressure of the mixture of materials. The hydrolysis is carried out for a reaction time not exceeding three hours, preferably from 0.5 to 3 hours, and in the absence of copper or a copper-containing catalyst.

The invention concerns a process for carrying out the hydrolysis of di- and trichlorobenzenes employing each of the reaction conditions set forth in items (a), (b) and (c), just mentioned, to obtain good yields of the mono- and dichlorophenols resulting from the replacement of a single chlorine atom by a hydroxyl group. The invention utilizes a readily available, inexpensive, non-toxic, non-flammable reaction medium and permits the carrying out of the alkaline hydrolysis of di- and trichlorobenzenes to produce mono- and dichlorophenols, batchwise, or in continuous manner, on an economically commercial scale.

Sodium hydroxide is usually employed in the process. Other alkali metal hydroxides such as potassium hydroxide, or lithium hydroxide, or mixtures of any two or more alkali metal hydroxides can be used.

The alkali metal hydroxide is employed in amount corresponding to from 1.8 to 4.5, preferably from 2 to 4 gram molecular proportions per gram molecular equivalent proportion of the di- or trichlorobenzene employed, and in admixture with sufficient water to form an aqueous solution containing from 2 to 10 weight percent of the alkali metal hydroxide.

The hydrolysis is carried out at temperatures between 240° and 300° C., and at superatmospheric pressures. The reaction is usually carried out under the autogenous pressure of the mixture of materials at the reaction temperatures employed. Pressures of from about 500 to 1500 pounds per square inch are satisfactory and pressures of from 500 to 3000 pounds per square inch gauge pressure, or higher can be used.

The hydrolysis occurs readily under the aforementioned reaction conditions and is usually complete to produce the mono- or dichlorophenols in appreciable yield in a reaction time of from about 30 minutes or less to 90 minutes and reaction times of up to about 180 minutes can be used. The mixture of materials should not be heated at the reaction temperatures for prolonged periods of time such as to result in deterioration of the product, or in the formation of by-products resulting from the removal of more than one chlorine atom from an aromatic nucleus of the polychlorobenzene starting material.

The hydrolysis reaction is susceptible of considerable variation and modification as regards the reaction temperatures, the reaction time and the particular di- or trichlorobenzene starting material employed, to obtain the best yields of the mono- or dichloro-substituted phenols.

A reaction time of from 30 to 90 minutes is preferred. The hydrolysis of the dichlorobenzenes being preferably carried out at temperatures between 260° and 300° C. under the autogenous pressure of the mixture of the materials, and the hydrolysis of the trichlorobenzenes being carried out at preferred reaction temperatures between 240° and 280° C., to obtain the best yields of the mono- or dichlorophenols. It may be mentioned that under the hydrolysis conditions herein employed some isomerization of the monochlorophenol occurs. Thus the hydrolysis of para-dichlorobenzene results in a monochlorophenol product consisting principally of para-chlorophenol with a minor amount of meta-chlorophenol. Isomeric dichlorophenols are produced principally by the hydrolysis of a chlorine atom in different positions relative to one another on the aromatic nucleus of the trichlorobenzene starting material.

In practice, the di- or trichlorobenzene starting material and the alkali metal hydroxide, together with water, or a solution of the alkali metal hydroxide and water, are placed in a suitable pressure resistant vessel, e.g. an iron, steel, or stainless steel, autoclave, in the desired proportions. The mixture is agitated and heated at reaction temperatures between 240° and 300° C. under the autogenous pressure of the mixture of materials for a reaction time of not more than 180 minutes, preferably for a reaction time of from 30 to 90 minutes, then cooled and removed from the reaction vessel. The hydrolysis mixture is extracted with a water-immiscible organic liquid, e.g. benzene, toluene, or chlorobenzene, to separate the unreacted polychlorobenzene. The aqueous hydrolysis liquor containing the mono- or dichlorophenols in the form of their alkali metal salts is acidified with an acid such as sulfuric acid, or hydrochloric acid, preferably the latter, and the mono- or dichlorophenol separated from the aqueous liquor in usual ways, e.g. by extraction with a water-immiscible organic solvent such as benzene or toluene.

The hydrolysis of the di- or trichlorobenzenes to produce mono- or dichlorophenols can be carried out in continuous manner by feeding the di- or trichlorobenzene and a solution of the alkali metal hydroxide and water in the desired proportions to a reaction zone, e.g. a tubular reactor or other suitable vessel, wherein the materials are heated under a pressure at least as high as the autogenous pressure at temperatures and for reaction times as previously described, and thereafter cooling and discharging the mixture from the reaction zone, after which the products are recovered in usual ways.

The following examples illustrate ways in which the principle of the invention has been applied, but are not to be construed as limiting its scope.

EXAMPLE 1

A charge of 71.1 grams (0.485 mole) of para-dichlorobenzene (freezing point 53.1° C.), 48.3 grams (1.21 moles) of sodium hydroxide and 918 cc. of water was placed in an iron bomb. The mixture was agitated and heated at a temperature of 275° C. under autogenous pressure of the materials for a period of 2 hours, then cooled. The reacted material was removed from the bomb and was extracted five times, each with a 100 cc. portion of benzene. The benzene solutions were combined and distilled. There was obtained 10.8 grams of unreacted para-dichlorobenzene. The conversion was 84.7 percent. The aqueous hydrolysis liquor was acidified with hydrochloric acid. The acidic liquor was extracted five times, each with a 100 cc. portion of benzene. The benzene solutions were combined and distilled. There was obtained 36.4 grams (0.283 mole) of a monochlorophenol fraction boiling at temperatures between 112° and 125° C. at 25 millimeters. It was analyzed and found to cinsist of 87 percent by weight of para-chlorophenol and 13 percent of meta-chlorophenol. The yield of said monochlorophenol product was 69 percent based on the para-dichlorobenzene consumed in the reaction.

EXAMPLE 2

A charge of 71.1 grams of ortho-dichlorobenzene, 48.3 grams of sodium hydroxide and 918 cc. of water was placed in an iron bomb. The mixture was agitated and heated at a temperature of 275° C. under autogenous pressure for a period of 90 minutes, then cooled. The reacted mixture was extracted with about 100 cc. of benzene and the benzene layer separated. It was distilled. There was obtained 14.9 grams of unreacted ortho-dichlorobenzene. The conversion was 79 percent based on the ortho-dichlorobenzene initially used. The aqueous hydrolysis liquor was acidified with hydrochloric acid and the acidic solution extracted five times each with a 100 cc. portion of benzene. The benzene solutions were combined and distilled. There was obtained 42.8 grams of a monochlorophenol fraction boiling at temperatures of from 85° to 120° C. at 25 to 35 millimeters absolute pressure. It was analyzed and found to consist of 86 percent by weight of o-chlorophenol, 13.5 percent of m-chlorophenol and 0.5 percent of p-chlorophenol. The yield of said monochlorophenols was 87 percent based on the ortho-dichlorobenzene consumed in the reaction.

EXAMPLE 3

A charge of 23.8 grams (0.16 mole) of meta-dichlorobenzene, 16.1 grams of sodium hydroxide and 306 cc. of water was placed in an iron bomb. The mixture was agitated and heated at a temperature of 260° C. under autogenous pressure for a period of 2 hours, then cooled. The bomb was opened and the contents removed. The products were separated. There were obtained 4.2 grams of unreacted meta-dichlorobenzene and 14.2 grams of a monochlorophenol product containing 85 percent by weight of meta-chlorophenol.

EXAMPLE 4

In each of a series of experiments to determine the effect of the concentration of the sodium hydroxide in the aqueous starting solution on the hydrolysis, a charge of ortho-dichlorobenzene and sodium hydroxide in proportions corresponding to 2.5 grams molecular proportions of the sodium hydroxide per gram molecular equivalent proportion of the ortho-dichlorobenzene, and sufficient water to form an aqueous solution of the sodium hydroxide in concentration as stated in the following table, was sealed in an iron bomb. The mixture was agitated and heated at a temperature of 275° C. for a period of 90 minutes under autogenous pressure, then cooled. The reacted mixture was extracted with 100 cc. of benzene and the aqueous and organic layers separated. The benzene solution was distilled to recover the unreacted ortho-dichlorobenzene. The aqueous hydrolysis liquor was acidified with hydrochloric acid and the acidic aqueous liquor extracted four times, each with a 100 cc. portion of benzene. The benzene solutions were combined and distilled to recover the product. Table I identified the experiments and gives the weight in grams of the ortho-dichlorobenzene and sodium hydroxide employed. The table gives the amount of water employed and the concentration in percent by weight of the sodium hydroxide in the aqueous starting solution. The table gives the percent conversion, the weights of the recovered ortho-dichlorobenzene and the chlorophenol fraction and the yield of said chlorophenol, based on the ortho-dichlorobenzene consumed in the reaction.

Table 1

| Run No. | Starting Materials | | | | Conversion, Percent | Products | | |
|---|---|---|---|---|---|---|---|---|
| | o-Dichloro-Benzene, gms. | NaOH, gms. | H₂O, cc. | Solution, Percent NaOH | | O-Dichloro-Benzene, gms. | Chlorophenol | |
| | | | | | | | gms. | Yield, Percent |
| 1 | 10.3 | 7 | 343 | 2 | 59 | 4.2 | 4.9 | 92 |
| 2 | 23.7 | 16.1 | 306 | 5 | 76 | 5.8 | 13.6 | 87 |
| 3 | 47.0 | 31.8 | 286 | 10 | 60 | 18.9 | 19.4 | 79 |

EXAMPLE 5

In each of a series of experiments, a charge of 23.7 grams (0.16 mole) of ortho-dichlorobenzene, 16.1 grams (0.4 mole) of sodium hydroxide and 306 cc. of water was placed in an iron bomb. The mixture was agitated and heated at temperatures as stated in the following table under the autogenous pressure of the mixture of materials for a period of 60 minutes, then cooled. The hydrolyzed mixture was removed from the bomb. The products were recovered employing procedure similar to those described in Example 4. Table II identifies the experiments and gives the time and temperature conditions for which the hydrolysis reactions were carried out. The table gives the percent conversion, the weights of the recovered ortho-dichlorobenzene and the chlorophenol fraction and the yield of said chlorophenol, based on the ortho-dichlorobenzene consumed in the reaction.

Table II

| Run No. | Reaction Conditions | | Conversion, Percent | Products | | |
|---|---|---|---|---|---|---|
| | Time, Min. | Temp., °C. | | o-Di-chloro-Benzene, gms. | Chlorophenol | |
| | | | | | gms. | Yield, Percent |
| 1 | 60 | 260 | 38 | 14.8 | 6.9 | 89 |
| 2 | 60 | 275 | 76 | 5.8 | 13.6 | 87 |
| 3 | 60 | 300 | 89 | 2.7 | 12.9 | 70 |

EXAMPLE 6

In each of a series of experiments a charge of 31.8 grams (0.716 mole) of 1,2,4-trichlorobenzene, 14 grams (0.35 mole) of sodium hydroxide and 300 cc. of water was placed in an iron bomb. The mixture was agitated and heated under the autogeneous pressure of the mixture of materials for a period of time and at a temperature as stated in the following table, then cooled. The bomb was opened and the contents removed. The reacted material was extracted with benzene to separate the unreacted trichlorobenzene. The benzene solution was separated from the aqueous liquor and distilled to recover the trichlorobenzene. The aqueous hydrolysis liquor was made acidic with hydrochloric acid, then extracted four times, each with a 100 cc. portion of benzene. The benzene solutions were combined. The combined benzene solution was distilled to separate and recover the components. Table III identifies the experiments and gives the time and temperature conditions under which the hydrolysis reactions were carried out. The table gives the percent conversion based on the 1,2,4-trichlorobenzene starting material, the weight in grams of the recovered 1,2,4-trichlorobenzene, the weight of the dichlorophenols and the percent yield of said dichlorophenols, based on the trichlorobenzene consumed in the reaction. The product was a mixture of isomeric dichlorophenols.

Table III

| Run No. | Reaction Conditions | | Conversion, Percent | Products | | |
|---|---|---|---|---|---|---|
| | Time, Min. | Temp., °C. | | 1,2,4-Tri-Chloro-benzene, gms. | Dichlorophenol | |
| | | | | | gms. | Yield, Percent |
| 1 | 90 | 240 | 47.8 | 16.6 | 12.5 | 91.6 |
| 2 | 90 | 250 | 80.6 | 6.2 | 20.2 | 88.0 |
| 3 | 90 | 260 | 89.1 | 3.5 | 22.0 | 86.5 |
| 4 | 90 | 280 | 89.4 | 3.4 | 17.6 | 69.0 |

EXAMPLE 7

In each of a series of experiments a charge of 1,2,4-trichlorobenzene and sodium hydroxide in proportions corresponding to two gram molecular proportions of the sodium hydroxide per gram molecular equivalent proportion of the trichlorobenzene, and water sufficient to form an aqueous solution of the sodium hydroxide in concentration as stated in the following table, was placed in an iron bomb. The mixture was agitated and heated at a temperature of 250° C. under the autogenous pressure of the materials for a period of 90 minutes, then cooled. The bomb was opened and the contents removed. The products were separated employing procedures similar to those described in Example 6. The Table IV identifies the experiments and gives the concentration in percent by weight of the sodium hydroxide in the aqueous starting solution. The table gives the percent conversion based on the 1,2,4-trichlorobenzene starting material, the weight in grams of the recovered 1,2,4-trichlorobenzene, the weight in grams of the dichlorophenol product and the percent yield of said product based on the 1,2,4-trichlorobenzene consumed in the reaction. The product was a mixture of isomeric dichlorophenols.

Table IV

| Run No. | Hydrolysis Solution | Conversion, Percent | Products | | |
|---|---|---|---|---|---|
| | Concentration of NaOH in Water, Percent | | 1,2,4,-Tri-Chloro-Benzene, gms. | Dichlorophenols | |
| | | | | gms. | Yield, Percent |
| 1 | 2 | 83.5 | 2.3 | 9.9 | 95.8 |
| 2 | 4.45 | 80.6 | 6.2 | 20.2 | 88.3 |
| 3 | 10 | 53.3 | 31.7 | 26 | 79.7 |

EXAMPLE 8

In each of a series of experiments, a charge of 31.8 grams of 1,2,4-trichlorobenzene, 14 grams of sodium hydroxide and 300 cc. of water was placed in an iron bomb. The mixture was agitated and heated at a temperature of 250° C. under autogenous pressure of the mixture of materials for a time as stated in the following table, then cooled. The product was recovered employing procedures similar to those described in Example 6. Table V identifies the experiments and gives the reaction time and temperature conditions under which the hydrolysis was carried out. The table gives the percent conversion, based on the 1,2,4-trichlorobenzene starting material, the products obtained and the yield of the dichlorophenol product, based on the trichlorobenzene consumed.

Table V

| Run No. | Reaction Conditions | | Conversion, Percent | Products | | |
|---|---|---|---|---|---|---|
| | Time, Min. | Temp., °C. | | 1,2,4,-Trichlorobenzene, gms. | Dichlorophenols | |
| | | | | | gms. | Yield, Percent |
| 1 | 30 | 250 | 41.5 | 18.6 | 11.0 | 92.7 |
| 2 | 90 | 250 | 80.6 | 6.2 | 20.2 | 88.3 |
| 3 | 180 | 250 | 85.2 | 4.8 | 22.0 | 90.5 |

EXAMPLE 9

A mixture of 95.1 grams (0.52 mole) of 1,2,4-trichlorobenzene, 42 grams (1.05 moles) of sodium hydroxide and 900 cc. of water, was placed in an iron bomb. The mixture was agitated and heated at a temperature of about 250° C. under autogenous pressures for a period of 1.5 hours, then cooled. The reacted materials were removed from the bomb and mixed with 200 cc. of benzene. The aqueous and benzene layers were separated. The benzene layer was evaporated to dryness. There was obtained 16 grams of unreacted 1,2,4-trichlorobenzene. The aqueous hydrolysis layer was acidified with hydrochloric acid and mixed with 250 cc. of benzene. The aqueous and the benzene layers were separated. The benzene layer was distilled. There was obtained 58.4 grams (0.36 mole) of a dichlorophenol product. The product consisted of about 16 percent by weight of 2,4-dichlorophenol, 61.8 percent of 2,5-dichlorophenol and 22.2 percent of 3,4-dichlorophenol.

We claim:

1. In a process for making a chloro-substituted phenol by the alkaline hydrolysis of a polychlorinated benzene, the step which consists in hydrolyzing a polychlorinated benzene containing from two to three chlorine atoms as nuclear substituents by heating a mixture of one gram molecular proportion of the polychlorinated benzene, from 1.8 to 4.5 gram molecular proportions of an alkali metal hydroxide and sufficient water to form an aqueous 2 to 10 weight percent solution of the alkali metal hydroxide, at reaction temperatures between 240° and 300° C. under at least the autogenous pressure of the mixture of materials.

2. In a process for making a chloro-substituted phenol by the alkaline hydrolysis of a polychlorinated benzene, the steps which consist in hydrolyzing a polychlorinated benzene containing from two to three chlorine atoms as nuclear substituents by heating a mixture of one gram molecular proportion of the polychlorinated benzene, from 1.8 to 4.5 gram molecular proportions of an alkali metal hydroxide and sufficient water to form an aqueous 2 to 10 weight percent solution of the alkali metal hydroxide, at reaction temperatures between 240° and 300° C. under at least the autogenous pressure of the mixture of materials for a reaction time between 0.1 and 3 hours, then cooling the reacted materials and recovering the chloro-substituted phenol from the hydrolysis mixture.

3. A process as claimed in claim 2, wherein the alkali metal hydroxide is sodium hydroxide.

4. A process as claimed in claim 2, wherein the polychlorinated benzene is para-dichlorobenzene.

5. A process as claimed in claim 2, wherein the polychlorinated benzene is 1,2,4-trichlorobenzene.

6. A process as claimed in claim 2, wherein the polychlorinated benzene is ortho-dichlorobenzene.

7. A process for making dichlorophenols which comprises reacting 1,2,4-trichlorobenzene with sodium hydroxide by heating a mixture of one gram molecular proportion of the 1,2,4-trichlorobenzene, from 2 to 4 gram molecular proportions of sodium hydroxide and sufficient water to form an aqueous 2 to 10 weight percent solution of the sodium hydroxide, at reaction temperatures between 240° and 280° C. under at least the autogenous pressure of the mixture of materials for a reaction time of from 0.5 to 1.5 hours, then cooling the mixture and separating the dichlorophenol product from the hydrolysis mixture.

8. A process for making meta-chlorophenol which comprises reacting meta-dichlorobenzene with sodium hydroxide by heating a mixture of one gram molecular proportion of meta-dichlorobenzene, from 2 to 4 gram molecular proportions of sodium hydroxide and sufficient water to form an aqueous 2 to 10 weight percent solution of the sodium hydroxide at reaction temperatures between 240° and 280° C. under at least the autogenous pressure of the mixture of materials for a reaction time of from 0.5 to 1.5 hours, then cooling the mixture and separating meta-chlorophenol from the hydrolysis mixture.

References Cited in the file of this patent

UNITED STATES PATENTS 2,126,648    Lofton et al. _____ Aug. 9, 1938

FOREIGN PATENTS 1,049,023    France _____ Aug. 12, 1953
(Corresponding Great Britain, 718,779, Nov. 17, 1954

OTHER REFERENCES

Henaji: Chem. Abstracts, vol 48 (1954), Col. 2774 (1 page).